(12) United States Patent
Xie et al.

(10) Patent No.: US 8,416,659 B1
(45) Date of Patent: Apr. 9, 2013

(54) METHOD AND APPARATUS TO CORRECT DISTORTION

(75) Inventors: Jin Xie, Longmont, CO (US); Mats Oberg, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 182 days.

(21) Appl. No.: 12/964,241

(22) Filed: Dec. 9, 2010

Related U.S. Application Data

(60) Provisional application No. 61/287,107, filed on Dec. 16, 2009.

(51) Int. Cl.
*G11B 20/10* (2006.01)

(52) U.S. Cl.
USPC .................................................. 369/47.17

(58) Field of Classification Search ............... 369/47.17
See application file for complete search history.

(56) References Cited

U.S. PATENT DOCUMENTS

| | | | | | |
|---|---|---|---|---|---|
| 5,491,682 | A | * | 2/1996 | Dohmeier et al. | 369/124.12 |
| 5,629,911 | A | * | 5/1997 | Sasaki | 369/44.42 |
| 6,646,968 | B1 | * | 11/2003 | Miyaoka | 369/53.31 |
| 2002/0131351 | A1 | * | 9/2002 | Taguchi et al. | 369/47.17 |
| 2003/0117914 | A1 | * | 6/2003 | Kanaoka et al. | 369/47.17 |
| 2005/0174922 | A1 | * | 8/2005 | Shibuya et al. | 369/124.12 |

* cited by examiner

*Primary Examiner* — Wayne Young
*Assistant Examiner* — Brenda Bernardi

(57) ABSTRACT

Aspects of the disclosure provide a signal processing circuit to reduce signal distortions due to optical aberrations. The signal processing circuit includes a circuit configured to receive an electrical signal corresponding to a light beam reflected by a storage medium and filter the electrical signal to reduce distortions due to, for example, birefringence aberration in the light beam, and an equalizer configured to equalize the filtered electrical signal. In an example, the circuit is a median filter.

18 Claims, 11 Drawing Sheets if absolute value of {median {x(k),x(k-1),...,x(k-L+1)}} >= threshold
  y(k) = median {x(k),x(k-1),...,x(k-L+1)}
else
  y(k) = x(k-(L-1)/2).

FIG. 8A

Let i=k-(L-1)/2.

if x(i)>=threshold
 y(k) = threshold
elseif {max(x(i-1),...,x(i-(L-1)/2))>threshold} AND {max(x(i+1),...,x(i+(L-1)/2))>threshold
 y(k) = threshold
elseif x(i)<=-threshold
 y(k) = -threshold ;
elseif {min(x(i-1),...,x(i-(L-1)/2))<-threshold} AND {min(x(i+1),...,x(i+(L-1)/2))<-threshold}
 y(k) = -threshold ;
else
 y(k)=x(i);
end

FIG. 8B

METHOD AND APPARATUS TO CORRECT DISTORTION

INCORPORATION BY REFERENCE

This application claims the benefit of U.S. Provisional Application No. 61/287,107, "Use Median Filter to Combat Birefringence Distortion" filed on Dec. 16, 2009, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Optical aberrations, such as spherical aberrations, birefringence, astigmatism, and the like, distort signals read from an optical storage medium. In an example, an optical storage system directs a light beam to an optical storage medium. The light beam is reflected based on the data stored on the optical storage medium. In addition, the reflected light beam is affected by the optical aberrations. The optical storage system generates an electrical signal in response to the reflected light beam, and reproduces the data from the electrical signal. However, due to the optical aberrations, the electrical signal is distorted, and the data may be erroneously read.

SUMMARY

Aspects of the disclosure provide a signal processing circuit to reduce signal distortions due to optical aberrations. The signal processing circuit includes a circuit configured to receive an electrical signal corresponding to a light beam reflected by a storage medium and filter the electrical signal to reduce distortions due to, for example, birefringence aberration in the light beam, and an equalizer configured to equalize the filtered electrical signal.

According to an aspect of the disclosure, the signal processing circuit includes an analog to digital converter (ADC) configured to receive an analog input signal generated in response to the light beam, sample the analog input signal, and convert the sampled analog input signal into the electrical signal in a digital form.

In an example, the equalizer is a linear equalizer. In another example, the equalizer is a non-linear limit equalizer.

In an embodiment, the circuit is a median filter. When the equalizer is a limit equalizer, the median filter is combined with the limit equalizer to form a combined filter and equalizer to receive the electrical signal and output the equalized electrical signal.

The combined filter and equalizer includes a first path and a second path to process the electrical signal, and a combiner to combine the processed signals. In an example, the first path includes a median filter configured to filter the electrical signal, a limiter configured to restrict the filtered electrical signal, and a booster configured to boost the limited electrical signal. In another example, the first path includes a combined filter and limiter configured to filter and limit the electrical signal, and a booster configured to boost the filtered and limited electrical signal. The second path includes a delay unit configured to delay the electrical signal based on a total delay in the first path. The combiner combines the boosted electrical signal from the first path and the delayed electrical signal from the second path.

Further, the signal processing circuit includes a slicer configured to make data bit determinations for the equalized electrical signal based on a slicing threshold. Because the signal distortions are reduced, the bit determinations have less error.

Aspects of the disclosure provide a method for signal processing. The method includes receiving an electrical signal generated in response to a light beam reflected by a storage medium, filtering the electrical signal to reduce distortions due to birefringence aberration in the light beam, and equalizing the filtered electrical signal.

Aspects of the disclosure also provide an apparatus for reading a storage medium. The apparatus includes an optical pick-up unit, an analog processing path, an analog to digital converter (ADC), a filter circuit and an equalizer. The optical pick-up unit is configured to generate a read signal in response to a light beam reflected by the storage medium. The analog processing path is configured to generate an analog input signal based on the read signal. The ADC is configured to receive the analog input signal, sample the analog input signal, and convert the sampled analog input signal into a digital output signal. The filter circuit is configured to filter the digital output signal to reduce distortions due to birefringence aberration in the light beam. The equalizer is configured to equalize the filtered digital output signal.

BRIEF DESCRIPTION OF THE DRAWINGS

Various embodiments of this disclosure that are proposed as examples will be described in detail with reference to the following figures, wherein like numerals reference like elements, and wherein:

FIG. 8A shows an algorithm example for implementing the median filter 360 according to an embodiment of the disclosure;

FIG. 8B shows an algorithm example for implementing a combined filter and limiter module according to an embodiment of the disclosure.

DETAILED DESCRIPTION OF EMBODIMENTS

Figure 1:
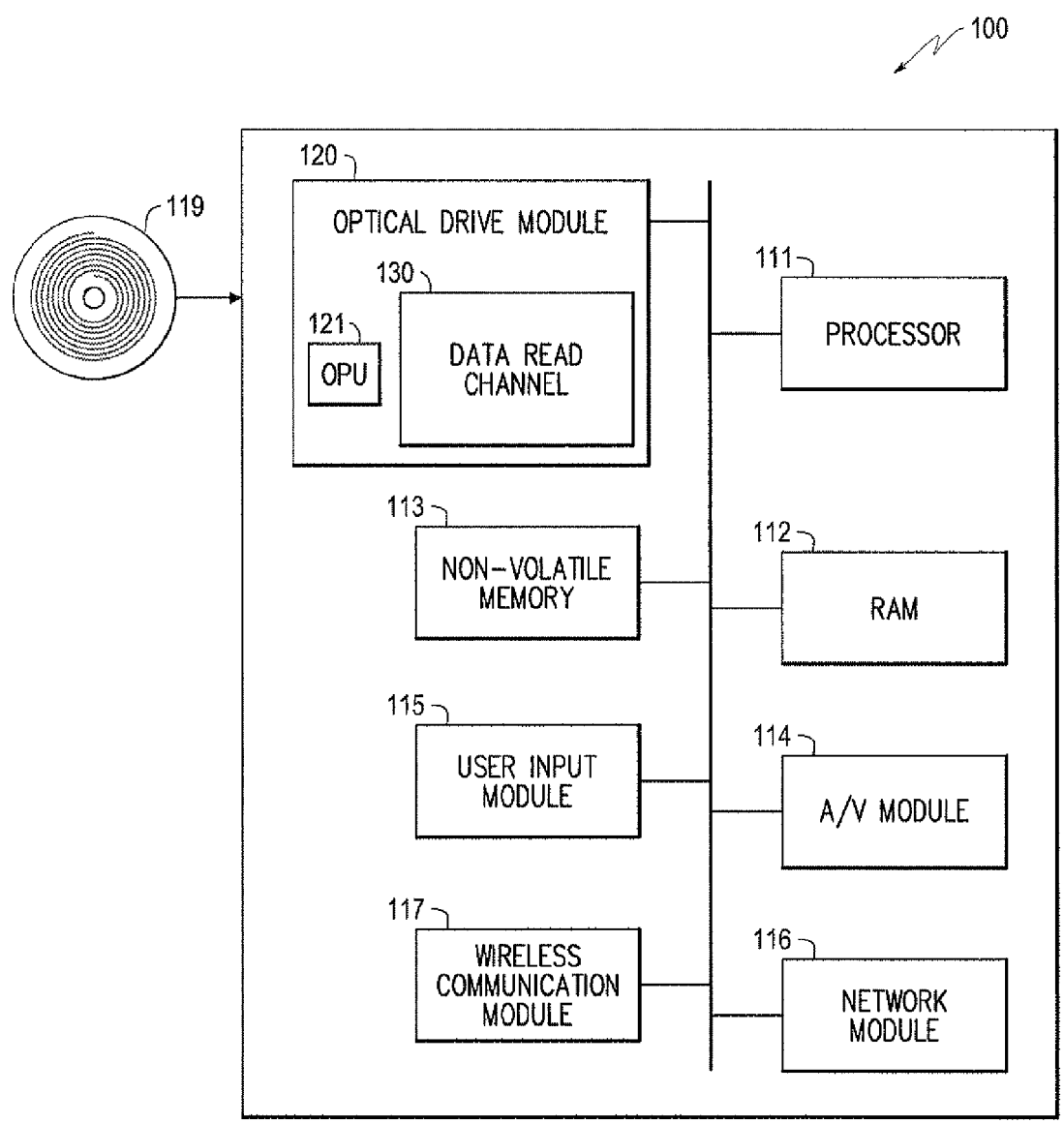
FIG. 1 shows a block diagram of a medium system example 100 and an optical disc example 119 according to an embodiment of the disclosure.

FIG. 1 shows a block diagram of a medium system example 100 and an optical disc example 119 according to an embodiment of the disclosure. The medium system 100 includes an optical drive module 120 for accessing the optical disc 119.

The optical drive module 120 includes an optical pickup unit (OPU) 121, and a data read channel 130. The OPU 121 is configured to generate an electrical signal in response to data stored on the optical disc 119. Specifically, the OPU 121 directs a laser beam to a location of the optical disc 119. The laser beam is reflected from the location of the optical disc 119. The reflected laser beam has light properties that correspond to data stored at the location of the optical disc 119. In addition, the reflected laser beam is affected by various other factors. In an example, the reflected laser beam is affected by inter-symbol interference. In another example, the reflected laser beam is affected by optical aberrations, such as spherical aberrations, birefringence, astigmatism, and the like.

The light properties can be detected by a light detector (not shown) of the OPU 121. The light detector of the OPU 121 generates an electrical signal, generally in the analog form, in response to the reflected laser beam. The electrical signal is then processed by other components of the optical drive module 120, such as the data read channel 130, to reproduce the data stored on the optical disc 119. It is noted that the electrical signal is distorted from ideal form due to, for example, noises, inter-symbol interference, and optical aberrations.

Figure 3:
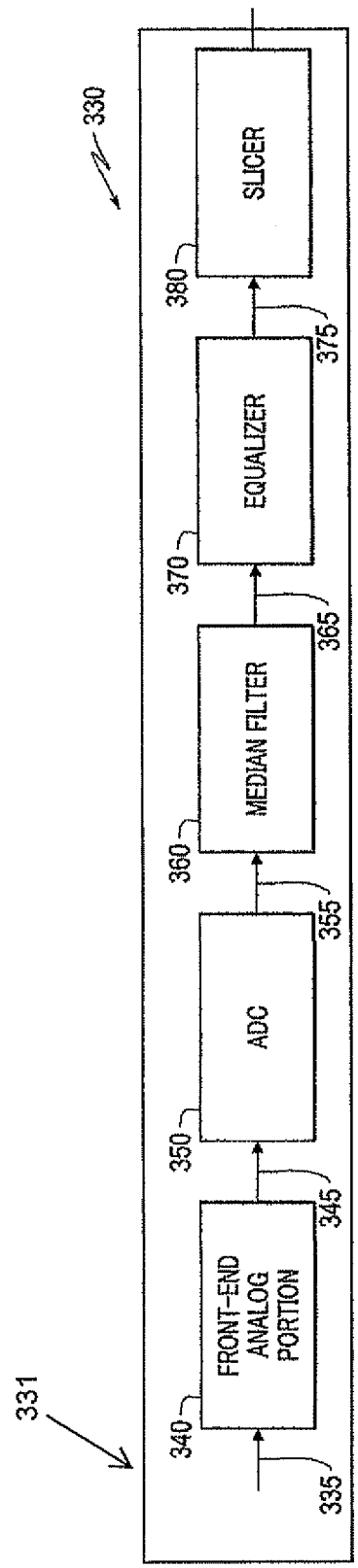
FIG. 3 shows a block diagram of a data read channel example 330 including a signal processing circuit 331 according to an embodiment of the disclosure.

The data read channel 130 includes a signal processing circuit 331 (FIG. 3). The signal processing circuit receives the electrical signal, processes the electrical signal, and reconstructs data from the electrical signal. According to the disclosure, the data read channel 130 includes a filter, such as a median filter, to reduce certain high frequency distortions, such as distortions due to birefringence.

In an example, the data read channel 130 includes an equalizer in the signal processing circuit 331 (FIG. 3). The equalizer equalizes the electrical signal to increase signal to noise ratio, and thus improves data reconstruction accuracy. Specifically, the equalizer boosts high frequency components corresponding to the data stored on the optical disc 119. Due to the reason that noises exist mainly in a low frequency region, using the equalizer increases signal to noise ratio.

However, some distortions, such as birefringence-induced distortions, are high frequency distortions. In an example, birefringence introduces dips in relatively large pulses in the electrical signal. The pulses in the electrical signal correspond to data marks or data pits on the optical disc 119. In an example, a pulse has a length from 2T-6T, where T is the bit interval. The dips due to the birefringence point to opposite polarity from the polarity of the relatively large pulses. For example, when a relatively large pulse has a negative polarity, the dip in the relatively large pulse due to the birefringence points to positive direction. Normally, the depths of the dips are not large enough to make the dips cross zero. However, when the equalizer boosts the high frequency components, the dips are boosted. Thus, the equalizer increases the depths of the dips. When the depth of a boosted dip is large enough to cross zero, further signal processing, such as slicing, can erroneously reconstruct data from the electrical signal.

According to an embodiment of the disclosure, the filter is used before the equalizer to reduce the depths of the dips. Thus, when the equalizer boosts the high frequency components, the boosted dips do not cross zero.

It is noted that any suitable filter that reduces the depths of dips can be used. In an embodiment, the filter is implemented using a median filter. A median filter is a nonlinear filter that outputs a median value of the most recent L inputs. In an example, the median filter sorts the most recent L inputs, and outputs the middle one of the sorted inputs. L is generally referred to as the length of the median filter. For example, when a median filter has a length of three, the median filter outputs the middle value of the sorted most recent three inputs. The following INPUT sequence and OUTPUT sequence show a specific example of inputs and outputs of a median filer having a length of three.

| INPUT =  | 1 | 2 | 5 | 3 | 3 | 4 | 10 | 8 | 6 | 9 ... |
|----------|---|---|---|---|---|---|----|---|---|-------|
| OUTPUT = |   |   | 2 | 3 | 3 | 3 | 4  | 8 | 8 | 8 ... |

It is noted that when L is even, a median filter sorts the L samples, picks the two median samples, and averages them as the median value for output. For example, when a median filter has a length of four, the median filter outputs an average of the two median ones of the most recent four inputs. The following INPUT sequence and OUTPUT sequence show a specific example of inputs and outputs of a median filer having a length of four.

| INPUT =  | 1 | 2 | 5 | 3   | 3 | 4   | 10  | 8 | 6 | 9 ...   |
|----------|---|---|---|-----|---|-----|-----|---|---|---------|
| OUTPUT = |   |   |   | 2.5 | 3 | 3.5 | 3.5 | 6 | 7 | 8.5 ... |

The median filter removes outliers. An outlier is a sample whose amplitude is very different from what is expected based on its neighbors. The median filter also reduces height of peaks or depths of dips, and keeps the rest of the values. The behavior of a median filter is related to its length.

The medium system 100 also includes other suitable component. In the FIG. 1 example, the medium system 100 includes a processor module 111, a random access memory (RAM) 112, a non-volatile memory 113, a user input module 115, an audio/video (AN) module 114, a network module 116, and a wireless communication module 117. These elements are coupled together as shown in FIG. 1.

The processor module 111 executes system and application codes. The non-volatile memory unit 113 holds information even when power is off. The non-volatile memory unit 113 can be used to store system and application codes, such as firmware. The RAM unit 112 is readable and writeable. Generally, the RAM unit 112 can have a relatively fast access speed. In an embodiment, the data and the codes are stored in the RAM unit 112 during operation, such that the processor module 111 can access the RAM unit 112 for the codes and the data instead of the non-volatile memory 113.

The user input module 115 enables a user to control operations of the medium system 100. The user input module 115 includes any suitable user input device, such as a keyboard, mouse, touch screen, and the like. In addition, the user input module 115 can include an interface that couples external user input devices to the medium system 100.

The audio/video module 114 includes any suitable audio/video device, such as a microphone, speaker, display screen, and the like. In addition, the audio/video module 114 can include an interface that couples external audio and video devices to the medium system 100. The audio/video module 114 can be utilized to play audio/video data stored in the optical disc 119.

The network module 116 and the wireless communication module 117 enable the medium system 100 to transmit the data stored on the optical disc 119 to other devices, or to store data received from the other devices onto the optical disc 119.

For ease and clarity of description, the embodiments are presented with a bus architecture. However, it should be understood that any other architecture can be used to couple components within the medium system 100.

It is noted that the optical disc 119 can be any suitable optical storage medium, such as CD, DVD, BLU-RAY, HD-DVD, and the like.

Figure 2A:
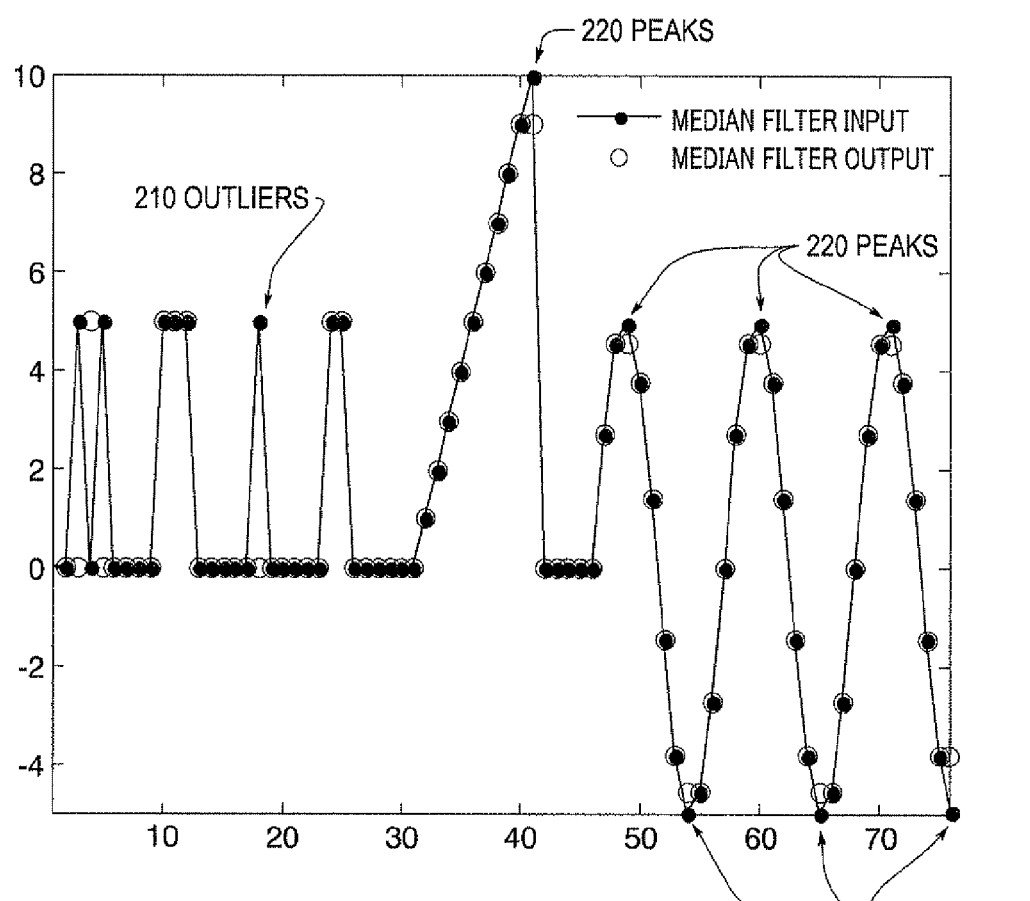
FIGS. 2A and 2B show median filter behaviors according to an embodiment of the disclosure.

FIG. 2A shows a behavior example of a first median filter having a length of three according to an embodiment of the disclosure. The first median filter removes sporadic outliers, as shown by 210, and rounds peaks, as shown by 220. Other samples are kept the same. When the peaks are rounded, the heights of the peaks are reduced.

Figure 2B:
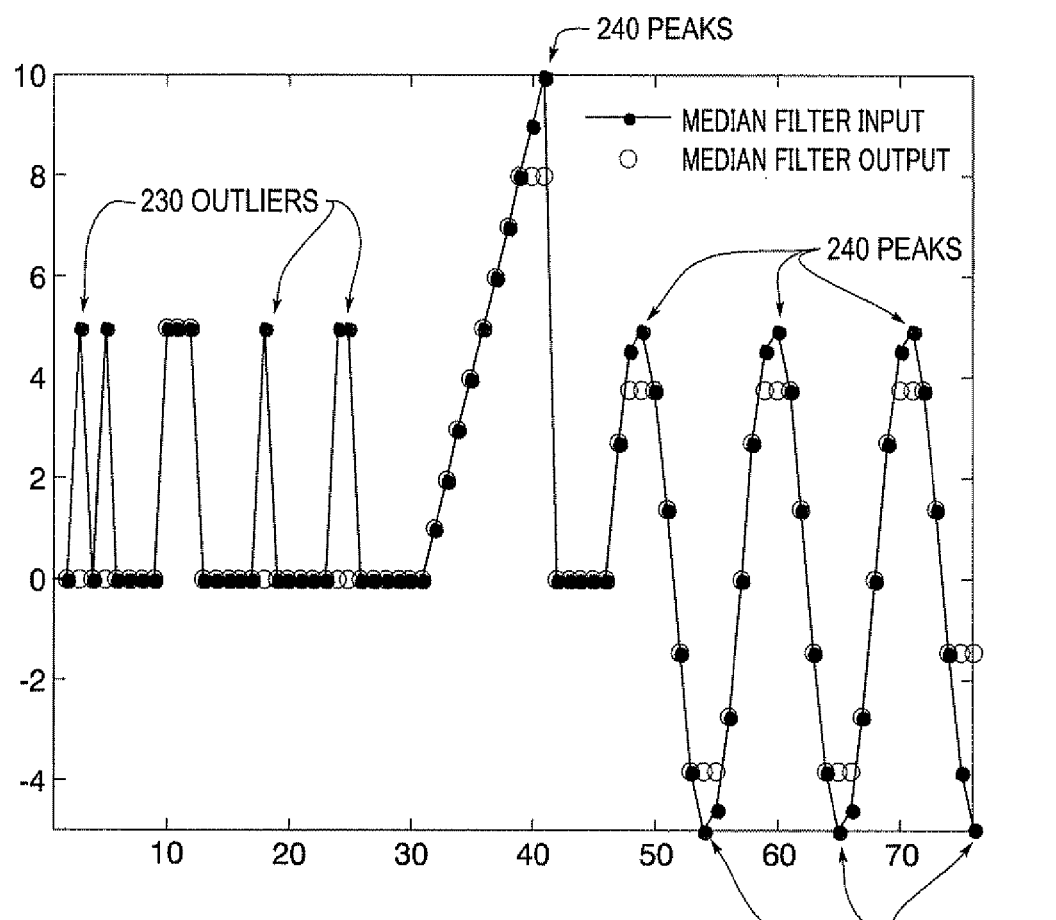

FIG. 2B shows a behavior example of a second median filter having a length of five according to an embodiment of the disclosure. The second median filter removes sporadic outliers, as shown by 230, and rounds peaks as shown by 240. Other samples are kept the same. Due to the larger length, the second median filter removes outliers of longer length, and reduces larger heights for the peaks, compared to the first median filter.

FIG. 3 shows a block diagram of a data read channel example 330 according to an embodiment of the disclosure. The data read channel 330 includes a front-end analog portion 340, an analog to digital converter (ADC) 350, a median filter 360, an equalizer 370, and a slicer 380. These elements can be coupled together as shown in FIG. 3.

The front-end analog portion 340 receives an electrical signal 335, regulates the electrical signal 335, and outputs an analog data signal 345. In an example, the electrical signal 335 is generated by an optical pick-up unit in response to a light beam reflected by an optical storage medium. The light beam has a light property corresponding to data stored on the optical storage medium. In addition, other factors, such as optical aberrations, noise, inter-symbol interference, and the like, also affect the light property. The optical pick-up unit detects the light property and generates the electrical signal 335 based on the detected light property. The optical aberrations, noises and inter-symbol interference distort the electrical signal. In an example, birefringence introduces dips in relatively large pulses, the dips point to opposite polarity from the polarity of the relatively large pulses. The birefringence-induced dips are generally high frequency distortions. In another example, noises are generally low frequency distortions.

The front-end analog portion 340 regulates the electrical signal 335 using analog techniques, such as amplification, compensation for offsets, adjusting an appropriate dynamic range, and the like. In an example, the front-end analog portion 340 includes an offset loop that adjusts offsets of the electrical signal 335. In another example, the front-end analog portion 340 includes a gain loop that adjusts an amplifier gain to regulate the electrical signal 335 to an appropriate dynamic range. Thus, the analog data signal 345 is suitable for subsequent circuit components to handle.

The ADC 350 receives the analog data signal 345, samples the analog data signal 345, and converts the sampled data signal into a digital signal 355. The digital signal 355 also has distortions due to noises, optical aberrations, inter-symbol interference, and the like. In an example, the digital signal 355 has low frequency distortions due to noises, and also has high frequency distortions, such as dips in the relatively large pulses due to birefringence.

The median filter 360 receives the digital signal 355, and reduces certain high frequency distortions, such as birefringence distortions, and the like. Specifically, the median filter 360 removes outliers in the digital signal 355, rounds peaks or dips in the digital signal 355, and keeps the other samples. When the digital signal 355 has dips in the relatively large pulses due to birefringence, the median filter 360 reduces depths of the dips. The median filter 360 outputs filtered digital signal 365.

It is noted that the median filter 360 can be implemented by various techniques. In an example, the median filter 360 uniformly applies a median function to all the samples. Alternatively, the median filter 360 can be implemented using a threshold-guided algorithm. FIG. 8A shows an algorithm example for implementing the median filter 360 according to an embodiment of the disclosure. By using a threshold to guide applying the median function, this algorithm avoids potentially distorting high frequency signals of small amplitude as the non threshold-guided algorithm might.

It is noted that the algorithm in FIG. 8A is suitable for L being odd. The algorithm can be suitably modified for L being even.

The equalizer 370 receives the filtered digital signal 365, equalizes the filtered digital signal 365 to a desired target response, and provides an equalized digital signal 375 to the slicer 380. In an embodiment, the equalizer 370 boosts high frequency components corresponding to the data stored on the optical storage medium, and increases signal to noise ratio. In addition, the equalizer 370 boosts high frequency distortions, such as the dips in the relatively large pulses. Because the depths of the dips are reduced by the median filter 360, the boosted dips have less chance to cross zero.

In an example, the equalizer 370 is a linear equalizer that uses a linear filter, such as a finite impulse response (FIR) filter, and the like, to process the received filtered digital signal 365.

In another example, the equalizer 370 is a non-linear equalizer, such as a limit equalizer (LE) 370. The limit equalizer 370 includes a limiter (not shown), and a booster (not shown). The limiter restricts signal amplitude, and the booster boosts high frequency components. The limit equalizer 370 boosts high frequency components without increasing inter-symbol interference.

The slicer 380 receives the equalized digital signal 375, and determines values based on one or more thresholds. In an example, the slicer 380 compares the equalized digital signal 375 with zero. When the equalized digital signal 375 is larger than zero, the slicer 380 outputs +1, and when the equalized digital signal 375 is smaller than zero, the slicer 380 outputs −1. When the boosted dips in the equalized digital signal 375 have less chance to cross zero, the slicer 380 has less chance to make erroneous determination. The determined values are provided to suitable circuit components for further processing.

Figure 4A:
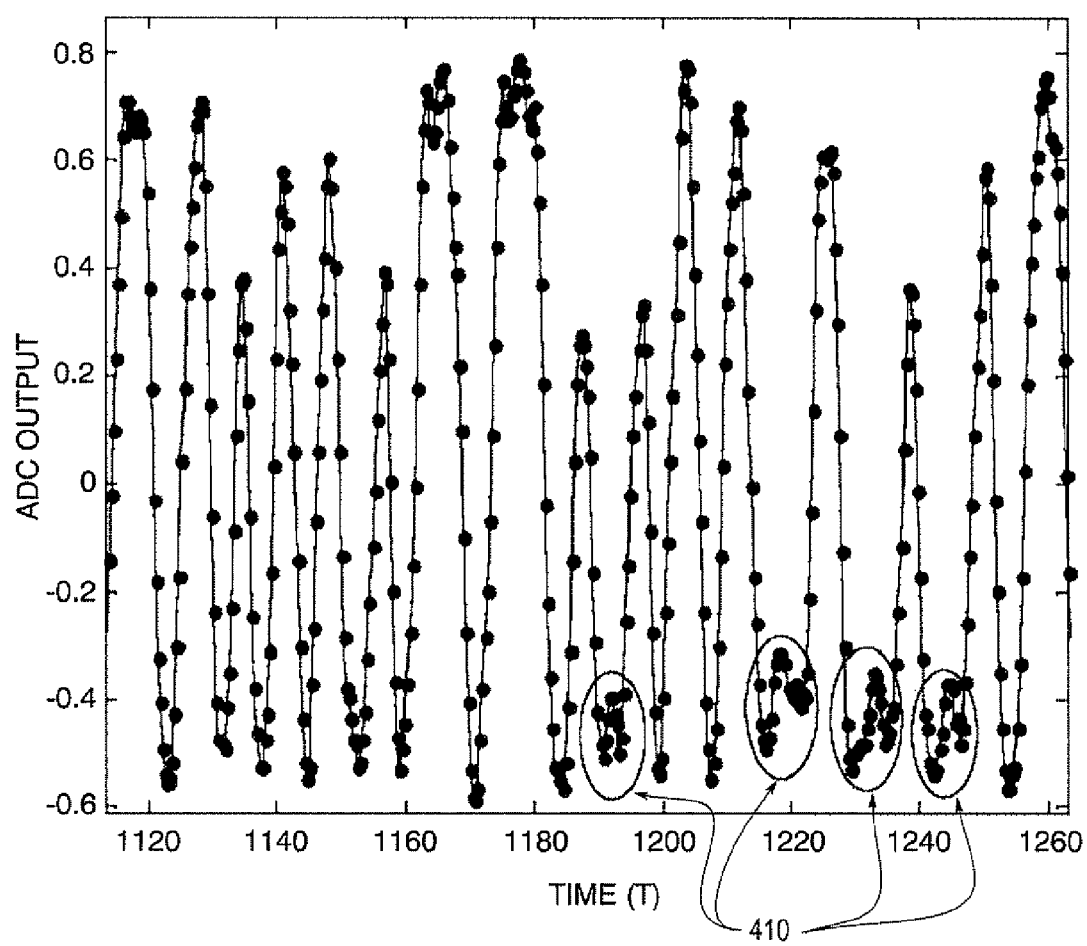
FIG. 4A shows signal distortions due to birefringence according to an embodiment of the disclosure.

FIG. 4A shows a digital signal example having distortions due to birefringence according to an embodiment of the disclosure. The digital signal is output from an analog to digital converter, such as the ADC 350. The digital signal includes relatively large pulses, such as shown by 410. The relatively large pulses have dips due to birefringence. In the FIG. 4A example, the relatively large pulses point to the negative polarity, and the dips point to the positive polarity.

Figure 4B:
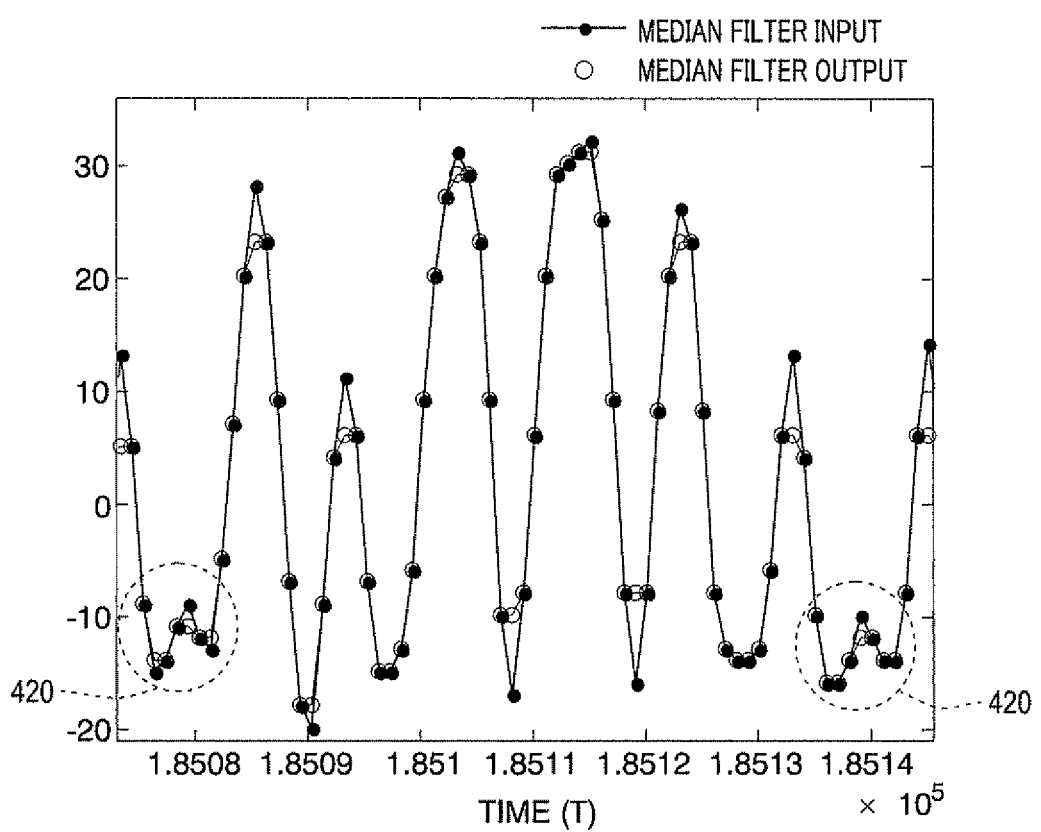
FIG. 4B shows reduced signal distortions by a median filter according to an embodiment of the disclosure.

FIG. 4B shows a behavior example of a median filter in response to dips according to an embodiment of the disclosure. The median filter has a length of three. The median filter receives a digital signal and outputs a filtered digital signal. The digital signal includes dips in relatively large pulses, as shown by median filter input in 420. The median filter reduces the depths of the dips, as shown by median filter output in 420.

Figure 5A:
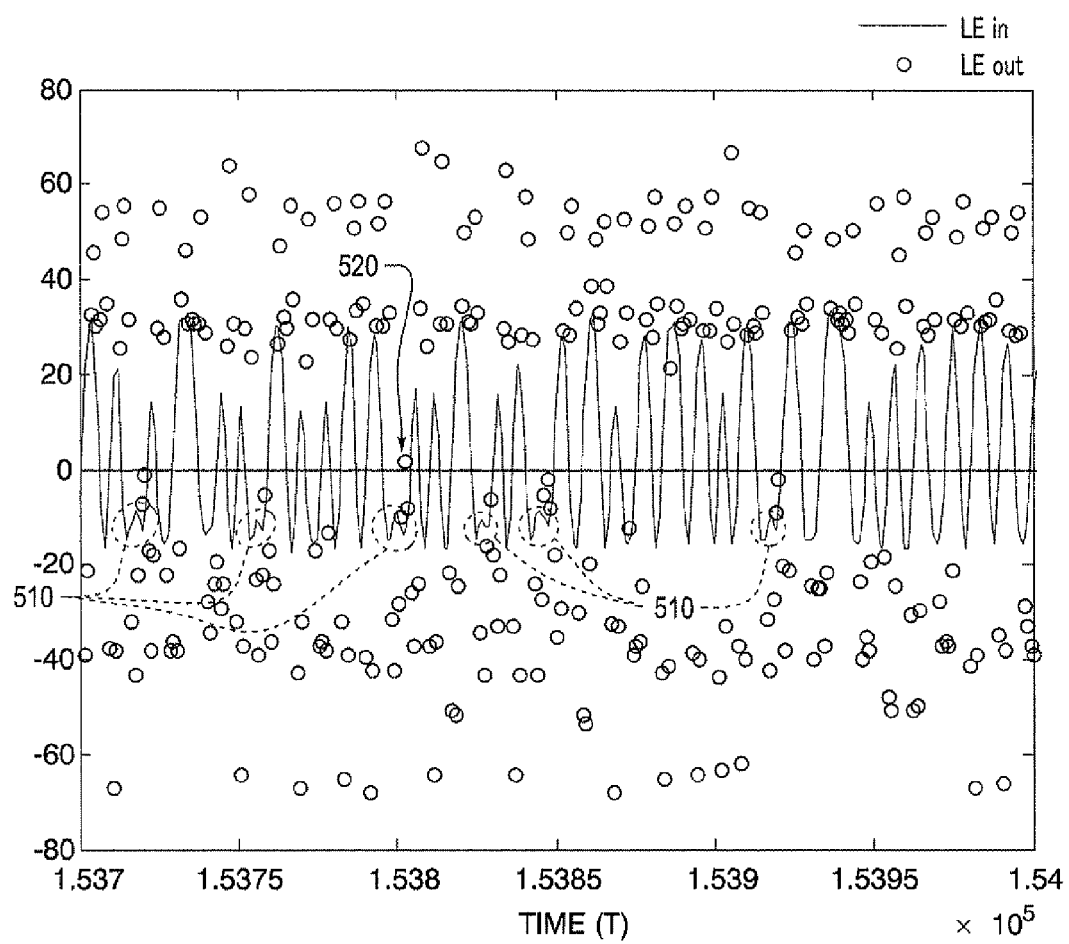
FIG. 5A shows an equalization result example without using median filter.

FIG. 5A shows an equalization example without using a median filter to reduce birefringence distortions according to an embodiment of the disclosure. Without using a median filter, an input signal has relatively deep dips, as shown in 510.

After an equalizer equalizes the input signal, the relatively deep dips are boosted. Some of the boosted dips, such as shown by 520, cross zero. When the output of the equalizer is provided to a slicer, the slicer makes erroneous determination. For example, when the slicer compares 520 to zero to determine a binary value, the slicer outputs +1 instead of −1.

Figure 5B:
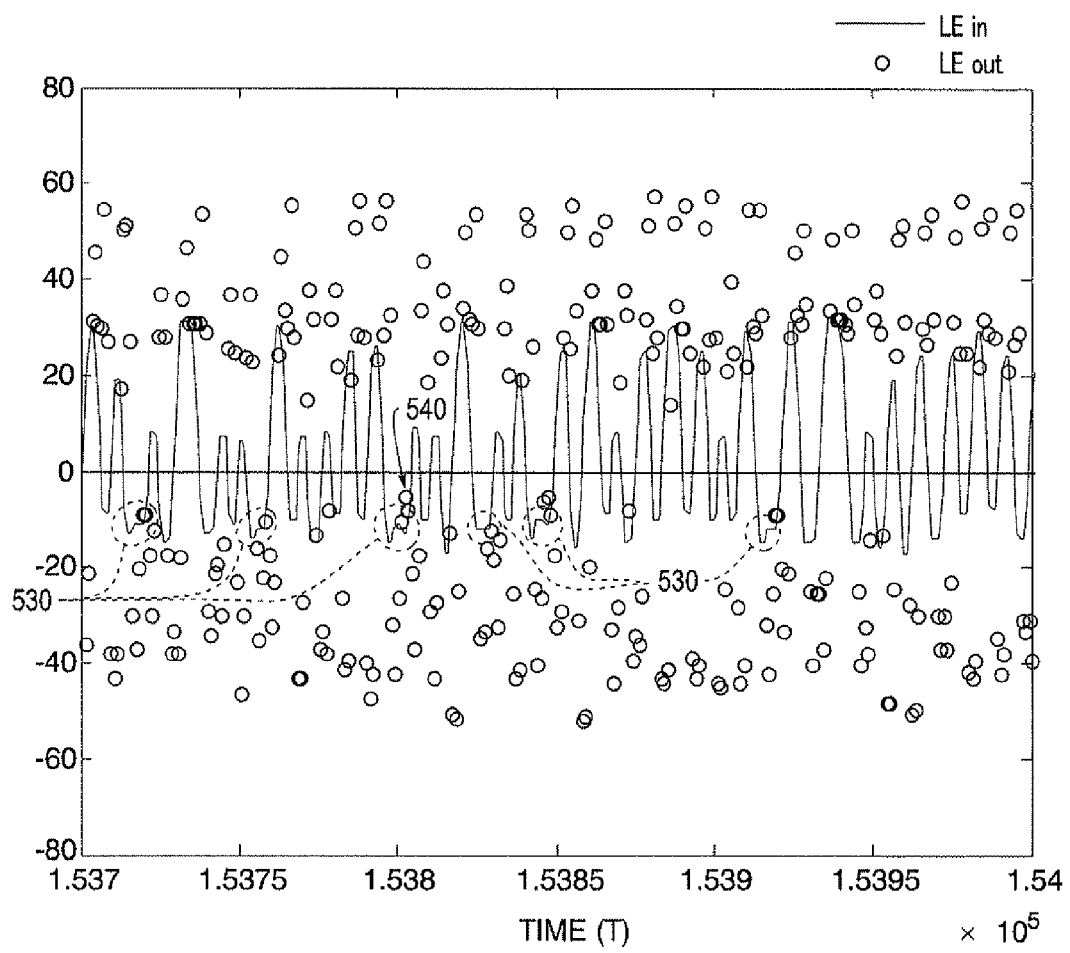
FIG. 5B shows an equalization result example when a median filter is used.

FIG. 5B shows an equalization example when a median filter is used to reduce birefringence distortions according to an embodiment of the disclosure. When the input signal to an equalizer is pre-processed by a median filter, the input signal has relatively shallow dips, as shown by 530. After equalization, the relatively shallow dips are boosted. The boosted dips have less chance to cross zero. For example, the boosted dip 530, which corresponds to 520 in FIG. 5A, does not cross zero. Thus, when the output of the equalizer is provided to a slicer, the slicer has less chance to make erroneous determinations.

According to an aspect of the disclosure, the data channel 330 can be suitably modified when a specific circuit component, such as a limit equalizer, is used.

Figure 6:
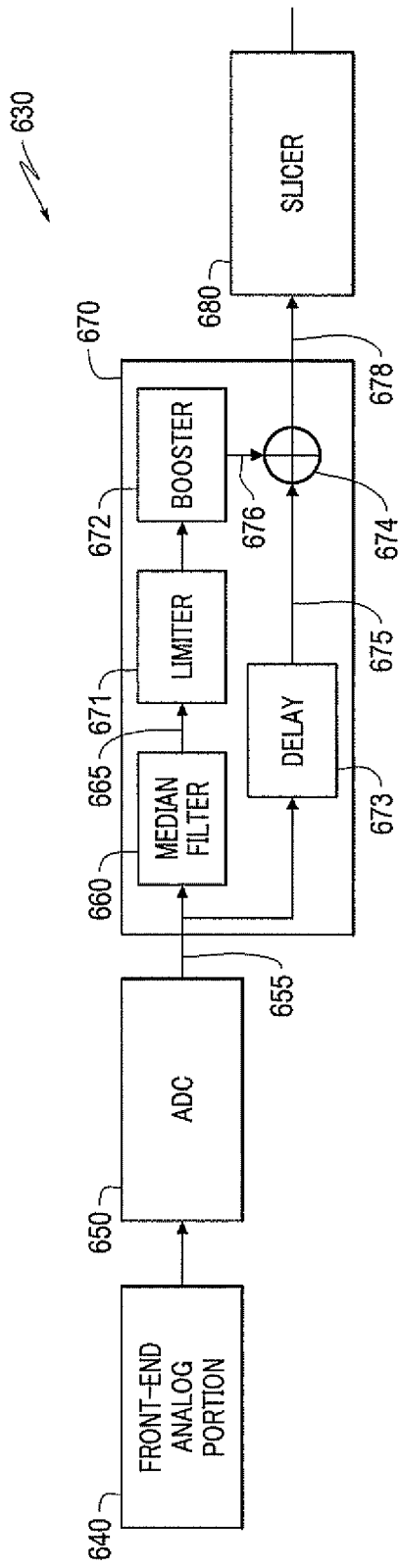
FIG. 6 shows another block diagram of a data read channel example according to an embodiment of the disclosure.

FIG. 6 shows another block diagram of a data read channel example 630 according to an embodiment of the disclosure. The data read channel 630 utilizes certain components that are identical or equivalent to those used in the data read channel 330; the description of these components has been provided above and will be omitted here for clarity purposes. However, in this embodiment, the data real channel 630 includes a combined filter and equalizer module 670 having both median filter function and limit equalizer function.

In an embodiment, the combined filter and equalizer module 670 includes a median filter 660, a limiter 671, a booster 672, a delay module 673, and a combiner 674. These elements are coupled together as shown in FIG. 6.

The combined filter and equalizer module 670 receives the digital signal 655. The digital signal 655 is branched to a first path and a second path. The first path includes the median filter 660, the limiter 671, and the booster 672. The second path includes the delay module 673.

The median filter 660 receives the digital signal 655, filters the digital signal 655, and outputs a filtered digital signal 665. Specifically, the median filter 660 removes outliers in the digital signal 655, reduces height of peaks or depths of dips in the digital signal 655, and keeps the other samples.

The limiter 671 restricts the amplitude of the filtered digital signal 665. The booster 672 boosts the high frequency components, and outputs a boosted digital signal 676.

The delay module 673 suitably delays the digital signal 655 based on a total delay in the first path, and outputs a delayed signal 675. The combiner 676 combiners the boosted digital signal 676 from the first path and the delayed digital signal 675 from the second path, and outputs the combined digital signal 678 to the slicer 680.

Figure 7:
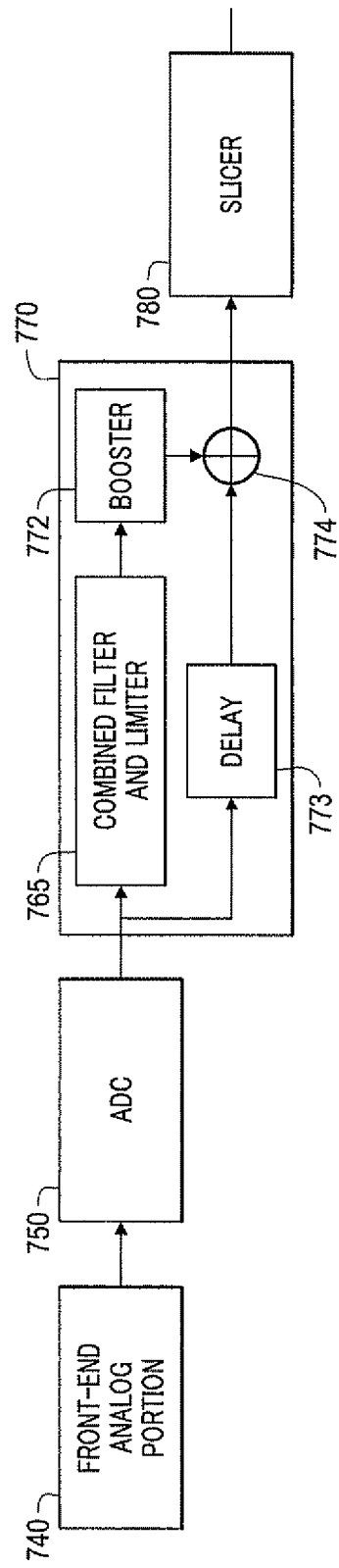
FIG. 7 shows another block diagram of a data read channel example according to an embodiment of the disclosure.

FIG. 7 shows another block diagram of a data read channel example 730 according to an embodiment of the disclosure. The data read channel 730 utilizes certain components that are identical or equivalent to those used in the data read channel 630; the description of these components has been provided above and will be omitted here for clarity purposes. However, in this embodiment, the combined filter and equalizer module 770 includes a combined filter and limiter module 765 having both median filter function and limiter function. The combined filter and limiter module 765 can be implemented by various techniques.

FIG. 8B shows an algorithm example that can be implemented in the combined filter and limiter module 765 according to an embodiment of the disclosure.

It is noted that the algorithm in FIG. 8B is suitable for L being odd. The algorithm can be suitably modified for L being even.

Figure 9:
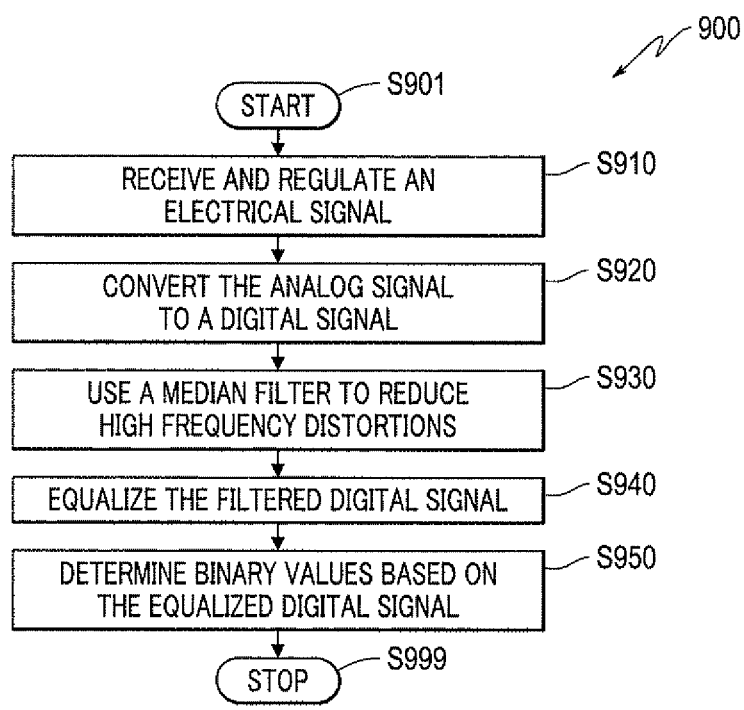
FIG. 9 shows a flow chart outlining a process example 900 for the data read channel 330 to process the electrical signal 335 according to an embodiment of the disclosure.

FIG. 9 shows a flow chart outlining a process example for the data read channel 330 to process the electrical signal 335 according to an embodiment of the disclosure. In an example, the electrical signal 335 is generated by an optical pick-up unit in response to a light beam reflected by an optical storage medium. The light beam has a light property corresponding to data stored on the optical storage medium. In addition, other factors, such as optical aberrations, noises, inter-symbol interference, and the like, also affect the light property. The optical pick-up unit detects the light property and generates the electrical signal 335 based on the detected light property. The electrical signal 335 is distorted due to the optical aberrations, noises and inter-symbol interference. In an example, birefringence introduces dips in relatively large pulses, the dips point to opposite polarity from the polarity of the relatively large pulses. The dips due to birefringence are generally high frequency distortions. In another example, noises are generally low frequency distortions. The data read channel 330 generates a binary sequence in response to the electrical signal 335, and reduces errors in the binary sequence due to various noises, optical aberrations, inter-symbol interference, and the like. The process starts at S901 and proceeds to S910.

At S910, the front-end analog portion 340 receives the electrical signal 335, regulates the electrical signal 335 using analog techniques, such as amplification, compensation for offsets, adjusting an appropriate dynamic range, and the like, and outputs an analog data signal 345 for subsequent circuit components to handle.

At S920, the ADC 350 receives the analog data signal 345, samples the analog data signal 345, and converts the sampled data signal into the digital signal 355. The digital signal 355 also has distortions due to noises, optical aberrations, inter-symbol interference, and the like. In an example, the digital signal 355 has low frequency distortions due to noises, and also has high frequency distortions, such as dips in the relatively large pulses due to birefringence.

At S930, the median filter 360 receives the digital signal 355, and reduces certain high frequency distortions, such as birefringence distortions, and the like. Specifically, the median filter 360 removes outliers in the digital signal 355, rounds peaks or dips in the digital signal 355, and keeps the other samples. When the digital signal 355 has dips in the relatively large pulses due to birefringence, the median filter 360 reduces depths of the dips. The median filter 360 outputs filtered digital signal 365.

At S940, the equalizer 370 receives the filtered digital signal 365, equalizes the digital signal 365 to a desired target response, and provides the equalized digital signal 375 to the slicer 380. In an embodiment, the equalizer 370 boosts high frequency components that correspond to the data stored on the optical storage medium, and thus increases signal to noise ratio. In addition, the equalizer 370 boosts high frequency distortions, such as the dips in the relatively large pulses. Because the median filter 360 reduces the depths of the dips, the boosted dips have less chance to cross zero.

At S950, the slicer 380 receives the equalized digital signal 375, and reconstructs data bits based on one or more thresholds. In an example, the slicer 380 compares the equalized digital signal 375 with zero. When the equalized digital signal 375 is larger than zero, the slicer 380 outputs +1, and when the equalized digital signal 375 is smaller than zero, the slicer 380 outputs −1. When the boosted dips in the equalized digital signal 375 have less chance to cross zero, the slicer 380 has less chance to make erroneous determination. The determined data bits are provided to suitable circuit components, such as Viterbi decoder, and the like, for further processing. The process then proceeds to S999, and terminates.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A signal processing circuit, comprising:
    A circuit including a median filter configured to receive an electrical signal corresponding to a light beam reflected by a storage medium and filter the electrical signal to reduce distortions due to birefringence aberration in the light beam; and
    an equalizer configured to equalize the filtered electrical signal.

2. The signal processing circuit of claim 1, further comprising:
    an analog to digital converter (ADC) configured to receive an analog input signal generated in response to the light beam, sample the analog input signal, and convert the sampled analog input signal into the electrical signal in a digital form.

3. The signal processing circuit of claim 1, wherein the equalizer is configured as a linear equalizer or a non-linear limit equalizer.

4. The signal processing circuit of claim 1, wherein the equalizer is configured as a limit equalizer, and the median filter is combined with the limit equalizer to form a combined filter and equalizer to receive the electrical signal and output the equalized electrical signal.

5. The signal processing circuit of claim 4, wherein the combined filter and equalizer comprises:
    a first path including:
        the median filter configured to filter the electrical signal;
        a limiter configured to restrict the filtered electrical signal; and
        a booster configured to boost the limited electrical signal;
    a second path including:
        a delay unit configured to delay the electrical signal based on a total delay of the median filter, the limiter and the booster in the first path; and
    a combiner configured to combine the boosted electrical signal from the first path and the delayed electrical signal from the second path.

6. The signal processing circuit of claim 4, wherein the combined filter and equalizer comprises:
    a first path including:
        a combined filter and limiter configured to filter and limit the electrical signal; and
        a booster configured to boost the filtered and limited electrical signal;
    a second path including:
        a delay unit configured to delay the electrical signal based on a total delay of the combined filter and limiter, and the booster in the first path; and
    a combiner configured to combine the boosted electrical signal from the first path and the delayed electrical signal from the second path.

7. The signal processing circuit of claim 1, further comprising:
    a slicer configured to make data bit determinations for the equalized electrical signal based on a slicing threshold.

8. A method for signal processing, comprising:
    receiving an electrical signal generated in response to a light beam reflected by a storage medium;
    filtering the electrical signal with a median filter to reduce distortions due to birefringence aberration in the light beam; and
    equalizing the filtered electrical signal.

9. The method of claim 8, wherein equalizing the filtered electrical signal further comprises:
    linear-equalizing the filtered electrical signal; or
    limit-equalizing the filtered electrical signal.

10. The method of claim 8, wherein filtering the electrical signal and equalizing the filtered electrical signal further comprises:
    filtering in a first path the electrical signal by the median filter;
    limiting the filtered electrical signal in the first path;
    boosting the limited electrical signal in the first path;
    delaying in a second path the electrical signal based on a total delay of the first path; and
    combining the boosted electrical signal from the first path and the delayed electrical signal from the second path.

11. The method of claim 8, wherein filtering the electrical signal and equalizing the filtered electrical signal further comprises:
    filtering and limiting in a first path the electrical signal by a combined filter and limiter;
    boosting the filtered and limited electrical signal in the first path;
    delaying in a second path the electrical signal based on a total delay of the first path; and
    combining the boosted electrical signal from the first path and the delayed electrical signal from the second path.

12. The method of claim 8, further comprising:
    slicing the equalized electrical signal based on a slicing threshold to make a data bit determination.

13. An apparatus for reading a storage medium, comprising:
    an optical pick-up unit configured to generate a read signal in response to a light beam reflected by the storage medium;
    an analog signal processing path configured to generate an analog input signal based on the read signal;
    an analog to digital converter (ADC) configured to receive the analog input signal, sample the analog input signal, and convert the sampled analog input signal into a digital output signal;
    a circuit configured to filter the digital output signal to reduce distortions due to birefringence aberration in the light beam; and
    an equalizer configured to equalize the filtered digital output signal.

14. The apparatus of claim 13, wherein the equalizer is configured as a linear equalizer or a non-linear limit equalizer.

15. The apparatus of claim 13, wherein the circuit is configured as a median filter.

16. The apparatus of claim 15, wherein the equalizer is configured as a limit equalizer and the median filter is combined with the limit equalizer to form a combined filter and equalizer to receive the digital output signal and output the equalized digital output signal.

17. The apparatus of claim 16, wherein the combined filter and equalizer comprises:
    a first path including:

the median filter configured to filter the digital output signal;

a limiter configured to restrict the filtered digital output signal; and a booster configured to boost the limited digital output signal;

a second path including:

a delay unit configured to delay the digital output signal based on a total delay of the median filter, the limiter and the booster in the first path; and a combiner configured to combine the boosted digital output signal from the first path and the delayed digital output signal from the second path.

18. The apparatus of claim 16, wherein the combined filter and equalizer comprises:

a first path including:

a combined filter and limiter configured to filter and limit the digital output signal; and a booster configured to boost the filtered and limited digital output signal;

a second path including:

a delay unit configured to delay the digital output signal based on a total delay of the combined filter and limiter, and the booster in the first path; and a combiner configured to combine the boosted digital output signal from the first path and the delayed digital output signal from the second path.

* * * * *